United States Patent [19]
Bastgen et al.

[11] 4,402,834
[45] * Sep. 6, 1983

[54] METHOD FOR DEWATERING SLUDGE-TYPE MATERIAL

[75] Inventors: Wendel Bastgen, Betzdorf; Helmut Schreiber, Bottenberg; Eugen Grumbel, Niederfischbach, all of Fed. Rep. of Germany

[73] Assignee: Albert Klein KG, Nieder-fischbach, Fed. Rep. of Germany

[*] Notice: The portion of the term of this patent subsequent to Mar. 11, 1997, has been disclaimed.

[21] Appl. No.: 250,945

[22] Filed: Apr. 6, 1981

Related U.S. Application Data

[63] Continuation of Ser. No. 574,290, May 5, 1975, abandoned.
Continuation of Ser. No. 812,568, Jul. 5, 1977, Pat. No. 4,192,743.

[30] Foreign Application Priority Data

May 8, 1974 [DE] Fed. Rep. of Germany ....... 2422208

[51] Int. Cl.³ .............................................. C02C 1/22
[52] U.S. Cl. ................................. 210/712; 210/770; 210/772; 210/783; 210/784; 210/790; 210/798; 210/805; 210/806
[58] Field of Search ............... 210/196, 394, 712, 738, 210/768, 769, 770, 772, 779, 781, 783, 784, 790, 210/797, 798, 805, 806

[56] References Cited

U.S. PATENT DOCUMENTS

| | | | |
|---|---|---|---|
| 2,450,522 | 10/1948 | North | 210/199 |
| 2,798,609 | 7/1957 | Smith et al. | 210/770 |
| 3,117,927 | 1/1964 | Smith | 210/326 |
| 3,273,494 | 9/1966 | Cocchiarella | 100/121 |
| 3,577,341 | 5/1971 | Keith, Jr. et al. | 210/712 |
| 3,617,539 | 11/1971 | Grutsch et al. | 210/18 X |
| 3,638,793 | 2/1972 | Peck | 210/108 X |
| 3,677,405 | 7/1972 | Keith, Jr. | 210/181 X |
| 3,740,363 | 6/1973 | Fuller | 210/609 |
| 3,800,952 | 4/1974 | Bastgen | 210/324 |
| 4,192,743 | 3/1980 | Bastgen et al. | 210/712 |

*Primary Examiner*—David R. Sadowski
*Attorney, Agent, or Firm*—Hane, Roberts, Spiecens & Cohen

[57] ABSTRACT

A process of dewatering sludge in which raw sludge and a flocculating agent are first mixed by suitable means, then fed into a rotary filter drum or similar device to effect thickening of the sludge and partial dewatering thereof. The now thickened sludge is then conveyed through a filtering assembly in which the sludge is subjected to further dewatering forces, which could be vacuum, centrifugal, static pressure, or pressure while moving along the filter surfaces, thereby further dewatering the sludge. The filtrate discharged from the filter drum and the filtering assembly and also wash water used for cleaning the filter surfaces in the filter drum and the filtering assembly are at least partly returned to the filter drum to effect total flocculation and recapture of sludge particles contained in the filtrate and the wash waters. In the partial dewatering of sludge in the drum filter, the solids in the wash water used to wash the drum filter are recaptured within the sludge in the drum before the thickened sludge or filtrate is discharged.

8 Claims, 1 Drawing Figure

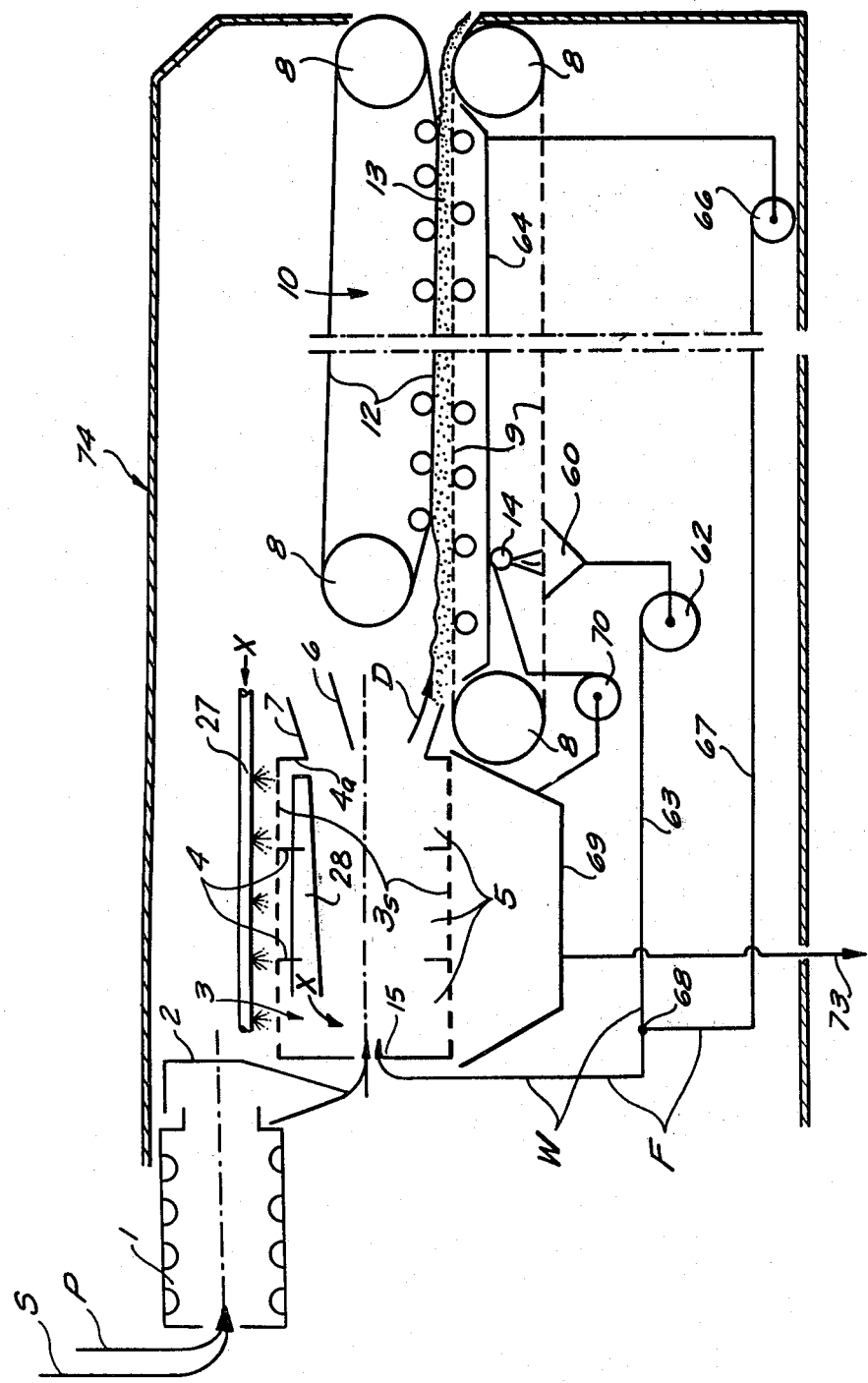

METHOD FOR DEWATERING SLUDGE-TYPE MATERIAL

This is a continuation, of application Ser. No. 029,751, filed Apr. 13, 1979 is now abandoned.

The invention relates to a process of dewatering sludge-type material and particularly to a process of dewatering sludge, sewage and other waste material requiring clarification and separation.

BACKGROUND

There are known processes in which the sludge and other material of that type is mixed with a flocculating agent and then conveyed through a filtering device for separating the filtrate from a cake as formed from the sludge upon extracting excess liquid therefrom.

To effect continuous dewatering of sludge, sewage and similar material are passed after a preceding total flocculation by addition of polyelectrolytes or other suitable flocculents, through centrifuges and stationary pressure filters. Also used are filtering devices which include as filter material sieves or textile fabrics, for instance, filter belt presses or filter presses of the drum type. There are also known for the purpose vacuum drum filters or vacuum flat bed filters and combinations of several such assemblies. To obtain the desired low residual moisture in the finished product it is generally required to carry out the removal of moisture in several stages when devices of the kind heretofore known are used.

In the preliminary dewatering zone of devices as now known, the flocculated suspension is subjected to a relatively low pressure drop; in most instances merely the force of gravity is applied or a relatively low hydrostatic pressure.

In the subsequent zone, the pressures of other forces which are used to effect dewatering must be considerably higher since the preliminary dewatering results is a corresponding hardening of a material to be processed. In the third zone, the pressure to be applied must be further increased whereby simultaneously shear forces must be applied by causing the compressed cakes to move.

In particular, the pressures and shear forces as are required in the last two zones causes a considerable accumulation of solid material on and in the filter drums or in the fabric bands used as filters. As a result, such filter material cannot be used for dewatering at low pressure. In continuous operation, it becomes necessary to operate a washing device either permanently or at intervals-using water at pressures from and to eleven atmospheres.

Such washing devices serve to flush out solid particles as are retained in the meshes of the fabric used as filter material. The quantity of water used for washing is considerable in practice and may reach several times the quantity of sludge to be processed. Moreover, the wash water tends to be strongly contaminated by the solid particles. In some cases up to 10% of the solid material may be carried out with the wash water; another 5% may be in the filtrate water from the dewatering zones of higher pressure. These solids often impose great demands on other processes within the system; their need for separate additional purification creates significant additional costs.

The output of filter belt presses, vacuum filters, etc. is frequently limited by the efficiency of the preliminary dewatering, at the end of which the sludge or other material to be processed should be of a consistency such that is could be subjected to forces greater than atmospheric. A typical case is the clarification of sewage in installations as used by communities, in which flocculation is effected by mixing of the sludge or sewage with polyelectrolytes. Large slimy pieces tend to form which move slowly over the sieves or the filtering fabrics and such large pieces constitute a dense layer which impedes the desired formation of cakes. In some instances it prevents further filtration. By turning over such masses the situation can be remedied to some extent, but there always remains a certain amount of clogging on the filtering medium. This fact and condition adds significantly to the cost of the dewatering installation itself, to its subsequent operating and service costs, and to the size of buildings required for its installation.

THE INVENTION

It is a broad object of the invention to provide a novel and improved process of dewatering material such as sludge, sewage and similar substances which is essentially free from the disadvantages and shortcomings of the previously described known methods for the purpose.

A more specific object of the invention is to provide a novel and improved process which permits the use of filter belt presses, drum filter presses, vacuum filters, centrifuges, and similar devices, without the shortcomings of the processes and installations as heretofore described.

SUMMARY OF THE INVENTION

The afore-mentioned objects, features and advantages, and other objects, features and advantages which will be pointed out hereinafter are obtained by returning to the mixture of sludge or other similar material and the flocculating agent at least partly the dirty filtrate which is extracted from the sludge during the filtering operation and/or dirty wash waters obtained by and during cleaning of the filtering surfaces. Such return of dirty filtrate and wash waters results, within a short reaction time, in total flocculation of the sludge or other particles as may be contained in the filtrate and the wash water. Moreover, such return of filtrate and wash waters and the resulting total flocculation reduces or even eliminates the tendency of sludge particles to adhere to filtering surfaces.

The inventors have sometimes found it to be particularly advantageous to feed the filtrate and the wash water in the same conduit before it comes in contact with the sludge. If desired, the filtrate and the wash water can be intimately mixed for the purpose. This mixture, of either filtrate and/or wash water, is then caused to react with the sludge which is to be thickened, the reaction proceeding both before dewatering takes place, and also while the mixture is travelling along the entire distance it travels to effect initial thickening. For this purpose, the mixture of either the filtrate and/or the wash water are preferably fed to the sludge at or upstream of the beginning of the distance through which it moves during thickening. As a result, the solids in the dirty filtrate and/or wash waters are subjected during the entire dwell time to the thickening material, and thus these solids can react with the conditioned main sludge feed while they are passing through the entire thickening path. In this way, the reaction can also take place without diluting the thickened sludge at the discharge of the thickening path.

Accordingly, thickening of the sludge material which is mixed with flocculating agent occurs simultaneously with a cleaning of the wash waters and/or filtrate which is obtained by withdrawal from the sludge after the dewatering thereof. We have found that the flocculating agent may be any one of, or a combination of a wide variety of such materials; including many of the high molecular weight organic polyelectrolytes, and/or the inorganic coagulants such as ferric chloride, lime, aluminum sulfate; these are all well known in the art of sludge treatment.

Often a residual flocculation action capability in the filtrate and also in the waash waters which have been in intimate contact with dirty filters or sieves, produces total flocculation of the solid particles initially contained in the sludge, at a lower cost for operating chemicals than would otherwise be the case. In the event part or all of the filtrate which is obtained during preliminary dewatering of the sludge, or part of the wash water of the preliminary dewatering unit itself, is guided over the entire length of the thickening operation, flocculated sludge particles are retained on the inner side of the sieves or other filtering means in the thickening device. However, clear water can freely flow off on the outside. Tests have shown that the yield of solid material obtained by carrying out the process of the invention is increased by about 10–15%. Such increase in the solids capture ratio can represent a reduction in the pollution load of the discharged filtrate by as much as 80% when compared to prior practice. This greatly reduces the load to be processed in a liquid purification portion of the plant.

Moreover, by conditioning the sludge after flocculation by means of dirty wash water and/or dirty filtrate, the adhesion of press cakes on a filter located downstream of the flocculation and reaction zones is considerably reduced when the cakes reach the discharge location. Similar good results are produced when the downstream higher force dewatering equipment is of types commonly known as vacuum filters, centrifuges, static pressure filters, and other dewatering devices in common use. In all cases this conditioning permits higher loading of the final dewatering equipment, thus fewer final machines, thus more economical capital and operating cost.

According to another aspect of the invention, wash waters and/or filtrate are fed into the flocculated sludge, for instance, by applying low energy centrifugal forces. These forces are preferably directed axially with the axis of the centrifugal forces. The use of such centrifugal forces considerably improves the action of the residual flocculation.

In still another version of the invention, the process of reaction between the solids in wash water and solids in the flocculated feed/sludge, and thereby the recapture of the solids in the dirty wash water, may be carried out solely within the thickening drum or similar device, with the partially dewatered output of thickener being the final sludge product of the invention, and without the step of further dewatering forces to produce a sludge cake. This is done by capturing the dirty wash water along the travel length of the reactor and returning it of the feed to the reactor/thickener, in order to react with the suitably combined feed sludge and flocculating agent as previously described herein. In general, the sludge output of such a reactor thickener dewatering will be flowable, as distinguished from the cake consistency of the multi-step dewatering arrangement. In actual treatment works, it is sometimes desirable, for a variety of reasons, to dewater the sludge only to this physical state.

The invention also provides a highly efficient and economic installation for carrying out the process of the invention.

More specifically, the installation is of simple construction which permits convenient servicing of the installation. At the inlet of a filtering device, included in the installation, there is at least one reactor thickener device upstream of which a mixing means is provided for the sludge or other material to be flocculated. A collector for the filtrate and/or a collector for the wash waters are connected with the reactor-thickener means. The conduits or pipes used for feeding back the wash waters and/or the filtrate communicate with the inlet end of the reactor-thickener means, preferably parallel and adjacent to the axis of the reactor-thickener means.

According to still another aspect of the invention, the reactor-thickener means is in the form of a rotary filter drum. The feed sludge flocculated with polyelectrolyte or other flocculating agent, together with sludge recaptured from dirty wash water and/or dirty filtrate, are guided through the filter drum lengthwise along the rotational axis thereof. The water which is released from this reaction is discharged through the filter wall of the drum. The thickened sludge is sheared at several points of its travel by annular baffles and discharged at the end of the drum.

After reaction between the flocculated feed sludge, the sludge in the dirty wash waters and/or the sludge in dirty filtrate, the discharged thickened sludge has about three to ten times the solids density of the original feed sludge. It is important to note that this effect is achieved, despite the dilution effect on solids density, which can reach 3:1, from returning wash waters and/or filtrate. The thickened sludge is now capable of withstanding additional filtration forces, so that immediately following the preliminary reactor, a second dewatering phase may be started. Second dewatering means can be any of the commonly known devices, such as belt filter presses, centrifuges, pressure filters, vacuum filters.

It is within the contemplation of the invention that the wash water of the reactor assembly itself be fed by conduits to the flocculated sludge in a first chamber of the reactor drum. In some designs this chamber is separated by annular baffles or other means. Solids recapture in the reactor is even more pronounced when the flocculated sludge is mixed with dirtier water released from second and subsequent dewatering zones. The length of the mixing time after adding the dirty filtrate and/or wash waters depends upon the reaction time of the sludge with the selected flocculation agent such as polyelectrolyte. This mixing time is varied by varying the rotational speed of the drum.

Residual flocculation in the filtrate will coagulate finely distributed sludge particles present in the wash waters to larger pieces, especially if the flow of the dirty waters is directed upon the feed sludge and flocculant. As a result, the quality of the filtrate flowing out of the reactor drum is outstandingly clean by comparison with the filtrates, centrates, or effluents of sludge dewatering methods heretofore known.

By carefully adjusting the rotational speed of the reactor drum it is possible to increase the output capacity and the solids recapture capability of the complete dewatering assembly to a very considerable extent; in some instances it may be doubled. Simultaneously, the filtrate which flows out of the complete dewatering installation including the reactor drum and the subsequent filter means is practically free of solid particles since solid particles contained in the filtrate and in the wash waters are nearly completely trapped and are returned to the sludge while being thickened.

According to this invention, the reactor-thickener means may be of many alternative types to the rotating drum; such as but not limited to stationary screens, vibrating screens, stationary drum screens with moving internal devices, centrifuges, belt filters etc.

Feeding back at least part of the wash waters and/or the filtrate also has the advantageous result, when secondary dewatering means of the present type are used, that the press cake when leaving the second dewatering assembly can be easily detached from the filtering medium proper. As a result, substantial quantities of solid particles will not be retained in the filtering material. This has the important advantage that the wash water consumption and the pressure applied to the wash water can be considerably reduced. Accordingly, the process and the installation according to the invention result in a highly desirable decrease of the energy consumption. The filtrate, as it is discharged from the reactor, can be used without difficulty as wash water.

BRIEF DESCRIPTION OF THE DRAWING

In the single FIGURE of the drawing, a sluge-type material processing installation for carrying out the methods of the invention is schematically shown.

DETAILED DESCRIPTION OF THE DRAWING

The installation comprises a mixing device 1 to which sludge S and a suitable flocculating agent P, such as polyelectrolyte, are continuously fed. After passing through the mixing device the now flocculated sludge S is discharged via a funnel 2 into a filter drum or reactor-thickener 3 disposed downstream of the mixing device.

The filter drum is divided by annular partition walls or baffles 4 into several chambers 5. The sludge travels successively through these chambers to obtain efficient removal of free water from the sludge feed plus the water in various recycled wash waters and filtrates. An annular partition wall 4a at the outlet end 6 of the drum is extended by a generally conical discharge slide 7. The now partly dewatered and thus thickened sludge D is fed by the discharge slide 7 to a belt-type press 10. This belt press comprises a lower filter belt 9 guided and driven by a pair of pulleys 8 and an upper pressure belt 12 guided and driven by a second pair of pulleys 8. The belts 9 and 12 are disposed parallel and spaced apart so as to form a filter path 13 to subject sludge conveyed through this path to filtering action under pressure. At the end of path 13, the sludge is discharged over one of the pulleys 8 for the filter band 9.

Wash water W as it is discharged from a device 14 removes sludge and other dirt particles from belt 9, and is collected in a basin 60 and fed by means of a pump 62 through a conduit 63 to an inlet 15 of filter drum 3 thereby recycling water W. The filtrate F obtained by means of band press 10 is received in a trough 64 and fed by means of a pump 66 through a conduit 67 connected to conduit 63 at 68 thereby also recycling the filtrate.

Wash water X as it is discharged from a device 27 removes all sludge and other dirty particles from drum walls $3_s$, and is collected in a trough 28 and fed by means of gravity to inlet area 15 of filter drum 3.

The mixture consisting of filtrate F, and water W obtained by the dewatering action of band press 10 is led into the filter drum 3 at approximately the same location as water X is discharged from trough 28. After the solids are removed, the waters pass through gaps $3_s$ in the drum walls and are collected in a trough 69 disposed underneath filter drum 3. The water in trough 69 is partly sucked out by pump 70 and the remaining part of the water is discharged via a conduit 73.

The entire installation may be placed in an enclosure 74 to protect it against accumulations of dirt.

We claim:
1. A process for continuous dewatering of sludge-type material containing solid particles comprising the steps of:
   receiving, from an outside process stream, material to be dewatered;
   adding the material to be dewatered into a mixing means,
   adding flocculant into said mixing means,
   mixing the material to be dewatered with said flocculant in said mixing means;
   passing the thus flocculated material through a reactor-thickener means in which water is separated therefrom through a filter surface of the reactor-thickener means while dewatered flocculated material remains on said filter surface,
   collecting the water separated from the flocculated material in the reactor-thickener means,
   axially advancing said dewatered flocculated material along said filter surface to an outlet end of said reactor-thickener means for discharge thereat, the flocculated material being progressively dewatered as it travels axially along said filter surface towards said outlet end,
   subjecting the thus dewatered flocculated material received from said reactor-thickener means as a solids mass to the action of a filtering means to extract filtrate from the material thereby causing solids from the material to form a sludge cake;
   discharging the cake;
   washing the filtering means with wash water obtained from the water collected from the reactor-thickener means to wash solids inclusive of flocculated solids from the filtering means; said wash water now containing said solids;
   returning at least part of said wash water with the flocculated solids contained therein after passage through the filtering means to the material to be dewatered for passage through the reactor-thickener means with the flocculated material received from the mixing means;
   the wash water and said flocculated material in said reactor-thickener means undergoing reaction on said filter surface for causing free water to be separated from the solids in the flocculated material and causing solids in the wash water to be captured by reaction with the flocculated solids in the flocculated material; and
   discharging clean free water from the reactor-thickener means as a discharged product from the process.
2. The process as claimed in claim 1, wherein said filtrate from the filtering means contains residual flocculated solids, said process further comprising returning at least part of said filtrate with the residual flocculated solids to the reactor-thickener means for passage therethrough with the flocculated material received from the mixing means to cause the combined filtrate and said flocculated material in the reactor-thickener means to undergo reaction on said filter surface of the reactor-thickener means for causing clean water to be separated from the solids in the flocculated material and causing the solids in the filtrate to be recaptured by reaction with flocculated solids in the flocculated material.

3. The process as claimed in claim 1, wherein the returned filtrate is introduced into the reactor-thickener means axially thereof.

4. The process as claimed in claim 1, wherein the material to be dewatered is subjected to a separating pressure in the reactor-thickener means which is less than the separating pressure in the filtering means.

5. The process as claimed in claim 1, wherein the reactor-thickener means comprises a rotatable drum having a filter surface, the dewatered, flocculated material traveling within the interior of said drum as it advances to the outlet end of the drum.

6. The process as claimed in claim 1 further comprising cleaning the filter surface of the reactor-thickener means with a cleaning liquid which is passed from one side of the filter surface to the other, said cleaning liquid picking up solids comprising flocculated material from said filter surface; and combining said cleaning liquid after cleaning the filter surface of the reactor-thickener means with material coming into the reactor-thickener means for causing the solids in the cleaning liquid to react with the flocculated material on the filter surface thereby at least partly removing solid material from the cleaning liquid.

7. The process as claimed in claim 1, wherein said solids mass is advanced as a flat layer along a rectilinear path in the filtering means to form said cake.

8. The process as claimed in claim 1 comprising causing the flocculated sludge in the reactor-thickener means to pass over successive annular partition walls forming baffles which define successive chambers through which the flocculated sludge travels in the reactor-thickener means.

* * * * *